United States Patent
Park et al.

(10) Patent No.: US 12,272,239 B2
(45) Date of Patent: Apr. 8, 2025

(54) SYSTEMS AND METHODS FOR DYNAMIC ROUTING OF USERS

(71) Applicant: North Carolina Agricultural and Technical State University, Greensboro, NC (US)

(72) Inventors: Hyoshin Park, Greensboro, NC (US); Larkin Folsom, Mebane, NC (US)

(73) Assignee: North Carolina Agricultural and Technical State University, Greensboro, NC (US)

( * ) Notice: Subject to any disclaimer, the term of this patent is extended or adjusted under 35 U.S.C. 154(b) by 131 days.

(21) Appl. No.: 17/826,723

(22) Filed: May 27, 2022

(65) Prior Publication Data
US 2022/0392343 A1    Dec. 8, 2022

Related U.S. Application Data

(60) Provisional application No. 63/194,042, filed on May 27, 2021.

(51) Int. Cl.
*G08G 1/0968* (2006.01)
*G06N 20/00* (2019.01)
(Continued)

(52) U.S. Cl.
CPC ....... *G08G 1/096811* (2013.01); *G06N 20/00* (2019.01); *G08G 1/0133* (2013.01);
(Continued)

(58) Field of Classification Search
CPC ........... G08G 1/096811; G08G 1/0133; G08G 1/0141; G08G 1/0145; G08G 1/096725;
(Continued)

(56) References Cited

U.S. PATENT DOCUMENTS

| 5,933,100 A | 8/1999 | Golding |
| 7,881,863 B2 | 2/2011 | Uyeki et al. |

(Continued)

FOREIGN PATENT DOCUMENTS

| EP | 1600910 B1 | 3/2009 |
| EP | 2515284 A1 | 10/2012 |
| EP | 3460407 A1 | 3/2019 |

OTHER PUBLICATIONS

Bogers, E. A., et al., "Joint modeling of advanced travel information service, habit, and learning impacts on route choice by laboratory simulator experiments", Transportation Research Record, 1926(1), 2005, pp. 189-197.

(Continued)

*Primary Examiner* — Nga X Nguyen
(74) *Attorney, Agent, or Firm* — Jenkins, Taylor & Hunt, P.A.

(57) ABSTRACT

Methods and systems for dynamically providing routes to users of vehicles. In some examples, a method includes determining a first traffic flow model for uninformed drivers of vehicles and determining a second traffic flow model for informed drivers of vehicles. Each of the informed drivers makes driving decisions based on receiving dynamic routes from a traffic routing system. The method includes iteratively updating the second traffic flow model using the first traffic flow model until a convergence criterion is met. The method includes sending, to at least one informed driver, a first dynamic route from a first origin to a first destination using the second traffic flow model.

19 Claims, 6 Drawing Sheets

(51) Int. Cl.
*G08G 1/01* (2006.01)
*G08G 1/0967* (2006.01)
(52) U.S. Cl.
CPC ......... *G08G 1/0141* (2013.01); *G08G 1/0145* (2013.01); *G08G 1/096725* (2013.01)
(58) Field of Classification Search
CPC ......... G08G 1/09685; G08G 1/096866; G08G 1/096877; G08G 1/0112; G06N 20/00; G06N 7/01; G06N 5/01
See application file for complete search history.

(56) References Cited

U.S. PATENT DOCUMENTS

| | | | |
|---|---|---|---|
| 9,275,544 B2 | 3/2016 | Levine et al. | |
| 10,692,370 B2 | 6/2020 | Elgie et al. | |
| 11,221,229 B1* | 1/2022 | Mclean | G05D 1/0088 |
| 2004/0039516 A1* | 2/2004 | Willembrock | G08G 1/0104 |
| | | | 340/933 |
| 2007/0299599 A1 | 12/2007 | Letchner et al. | |
| 2015/0319093 A1* | 11/2015 | Stolfus | G08G 1/0141 |
| | | | 370/237 |
| 2018/0108251 A1 | 4/2018 | Macfarlane et al. | |
| 2018/0357892 A1 | 12/2018 | Dong et al. | |
| 2019/0086224 A1* | 3/2019 | Sharma | G08G 1/0125 |
| 2021/0029612 A1* | 1/2021 | Hassan | G01C 21/3461 |

OTHER PUBLICATIONS

Di, X, et al., "Boundedly rational route choice behavior: A review of models and methodologies", Transportation Research Part B: Methodological, 85, 2016, pp. 142-179.

Doan, K., et al., "Dynamic system optimal model for multi-OD traffic networks with an advanced spatial queuing model", Transportation Research Part C: Emerging Technologies, 51, 2015, pp. 41-65.

Du, L., et al. "An adaptive information fusion model to predict the short-term link travel time distribution in dynamic traffic networks", Transportation Research Part B: Methodological, 46(1), 2012, pp. 235-252.

Folsom, L., et al., "Dynamic Mixed Information Strategy for Heterogeneous Network Users and System Optimal Design" 2021 (No. TRBAM-21-02070).

Folsom, L., et al., "Dynamic Routing of Heterogeneous Users After Traffic Disruptions Under Q2 a Mixed Information Framework" in Frontiers in Future Transportation, 3, 851069, May 18, 2022, pp. 1-19.

Han, K., et al., "Computing dynamic user equilibria on large-scale networks with software implementation", in Networks and Spatial Economics, 19, 2019, pp. 869-902.

Han, K., et al., "Formulation, existence, and computation of simultaneous route-and-departure choice bounded rationality dynamic user equilibrium with fixed or endogenous user tolerance", 2014, pp. 1-32.

Han, K., et al., "Formulation, existence, and computation of boundedly rational dynamic user equilibrium with fixed or endogenous user tolerance", Transportation Research Part B: Methodological, 79, 2015, pp. 16-49.

Jiang, Y. Q., et al., "Macroscopic modeling of pedestrian flow based on a second-order predictive dynamic model", Applied Mathematical Modelling, 40(23-24), 2016, pp. 9806-9820.

Lam, C. P., et al.,. "Improving human-in-the-loop decision making in multi-mode driver assistance systems using hidden mode stochastic hybrid systems", In 2015 IEEE/RSJ international conference on intelligent robots and systems (IROS) 2015, pp. 5776-5783.

Litescu, S. C et al., "The effect of information uncertainty in road transportation systems", Journal of computational science. 16, 2016, pp. 170-176.

Lu, C. C., et al., "A bi-criterion dynamic user equilibrium traffic assignment model and solution algorithm for evaluating dynamic road pricing strategies", Transportation Research Part C: Emerging Technologies, 16(4), 2008, pp. 371-389.

Osorio, C et al., "Dynamic network loading: a stochastic differentiable model that derives link state distributions", Procedia-Social and Behavioral Sciences, 17, 2011, pp. 364-381.

Park, H et al., "Anticipatory dynamic traffic sensor location problems with connected vehicle technologies", in Transportation Science, 52(6), 2018, pp. 1299-1326.

Park, H., et al., "Online optimization with look-ahead for freeway emergency vehicle dispatching considering availability. Transportation research part C", emerging technologies, 109, 2019, pp. 95-116.

Peeta, S et al., "System optimal and user equilibrium time-dependent traffic assignment in congested networks", in Annals of Operations Research, 60(1), 1995, pp. 81-113.

Silva, M. C., et al, "A multi-agent system for dynamic path planning", in 2010 second brazilian workshop on social simulation, 2010, pp. 47-51.

Tong, C. O et al., "A predictive dynamic traffic assignment model in congested capacity-constrained road networks", Transportation Research Part B: Methodological, 34(8), 2000, pp. 625-644.

Varia, H. R., et al., "Application of genetic algorithms for joint optimization of signal setting parameters and dynamic traffic assignment for the real network data", Research in Transportation Economics, 38(1),2013, pp. 35-44.

Wardrop, J. G. "Road paper. some theoretical aspects of road traffic research", Proceedings of the institution of civil engineers, No. 1(3), 1952, pp. 325-362.

Yildirimoglu, M., et al "Approximating dynamic equilibrium conditions with macroscopic fundamental diagrams", Transportation Research Part B: Methodological, 70. 2014, pp. 186-200.

Yildirimoglu, M., et al "Equilibrium Analysis and Route Guidance in Large-Scale Networks with MFD Dynamics", Transportation Research Procedia, 9, 2015, pp. 185-204.

Yu, Y., et al."Day-to-day dynamic traffic assignment with imperfect information, bounded rationality and information sharing", Transportation Research Part C: Emerging Technologies, 114, 2020, pp. 59-83.

Folsom, L., et al., "Information-theoretic navigation and stochastic user equilibrium. Proceedings of the INFORMS Transportation Science and Logistics (TSL) Second Triennial Conference (TSL2020)", George Mason University—May 27-29, 2020, pp. 27-29.

* cited by examiner

TABLE 1 | Table of Notation.

| | | |
|---|---|---|
| $N$ | ≜ | Set of all nodes $n$ |
| $\mathcal{L}$ | ≜ | Set of all directed links |
| $\mathcal{P}$ | ≜ | Set of all OD pairs $[r, s]$ |
| $\mathcal{K}$ | ≜ | Set of all routes across the network |
| $\mathcal{T}$ | ≜ | Set of all discrete time intervals |
| For OD pair $[r,s] \in \mathcal{P}$ | | |
| $K_{rs}$ | ≜ | Set of all routes connecting $[r, s]$ |
| $d_{rs}$ | ≜ | OD demand $[r, s]$ |
| $R_{rs}(t)$ | ≜ | Set of all canonical routes connecting $[r, s]$ for departure time $t$ |
| $TA_{rs}$ | ≜ | Desired arrival time at the destination for all travelers traveling across $[r, s]$ |
| For a route $k \in K$ and departure time $t \in \mathcal{T}$ | | |
| $h_k(t)$ | ≜ | Total path flow departing on route $k$ at time $t$ |
| $TT_k(t)$ | ≜ | Travel time on route $k$ for time $t$ |
| $SDC_k(t)$ | ≜ | Schedule delay cost on route $k$ for time $t$ |
| $PC_k(t)$ | ≜ | Total cost |
| $PMC_{k,t}$ | ≜ | Path Marginal cost |
| Parameters | | |
| $\Theta$ | ≜ | Relative range around shortest travel time for defining canonical routes |
| $\theta$ and $\theta_c$ | ≜ | Scaling parameters for Mlogit model |
| $\Delta$ and $\Delta_c$ | ≜ | Bounded-rationality indifference band |
| $\chi_{informed}$ | ≜ | Proportion of travelers who are informed |

FIG. 4

SYSTEMS AND METHODS FOR DYNAMIC ROUTING OF USERS

PRIORITY CLAIM

This application claims the priority benefit of U.S. Provisional Patent Application Ser. No. 63/194,042, filed May 27, 2021, the disclosure of which is incorporated herein by reference in its entirety.

STATEMENT OF GOVERNMENT INTEREST

This invention was made with Government support under 1910397 awarded by the National Science Foundation. The Government has certain rights in this invention.

TECHNICAL FIELD

This specification relates generally to methods, systems, and computer readable media for dynamic routing of users under a mixed information framework.

BACKGROUND

Dynamic Traffic Assignment (DTA) algorithms have been used to capture dynamic interaction between supply and demand under equilibrium and non-equilibrium conditions in a transportation network. The two optimal conditions for a transportation network are Dynamic User Equilibrium (DUE) and Dynamic System Optimal (DSO) equilibrium. Many conventional DTA algorithms solve for one of Wardrop's equilibrium conditions using a single group of drivers who share a common objective of minimizing their own travel cost or the total system cost.

SUMMARY

This document describes methods and systems for dynamic routing of users. The methods and systems can be used for reducing traffic congestion using the competing strategies between informed and uninformed drivers. Under a mixed information framework, a navigation app provides within-day route suggestions to informed drivers using predicted information about the time-varying route habits of uninformed drivers. The informed users detour from initially proposed routes to minimize network congestion after traffic disruptions, pushing the system toward optimal equilibrium, while uninformed drivers make day-to-day decisions which push the system toward user equilibrium. Simulations considering varying fractions of informed drivers show that congestion is reduced during abrupt phase transition before reaching equilibrium by approximately 59.2% when 20% of drivers are informed, and is nearly eliminated when 80% of drivers are informed, which could be achieved through connected vehicle technologies. Shared memory multi-core parallelization improved the computational efficiency In some examples, a method includes determining a first traffic flow model for uninformed drivers of vehicles and determining a second traffic flow model for informed drivers of vehicles. Each of the informed drivers makes driving decisions based on receiving dynamic routes from a traffic routing system. The method includes iteratively updating the second traffic flow model using the first traffic flow model until a convergence criterion is met. The method includes sending, to at least one informed driver, a first dynamic route from a first origin to a first destination using the second traffic flow model.

The computer systems described in this specification may be implemented in hardware, software, firmware, or any combination thereof. In some examples, the computer systems may be implemented using a computer readable medium having stored thereon computer executable instructions that when executed by the processor of a computer control the computer to perform steps. Examples of suitable computer readable media include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 4 shows a table of notations that summarizes the notations used in this document

DETAILED DESCRIPTION

This document describes an application of DTA which realistically simulates a transportation network in which drivers have different objectives and different time scales over which they make decisions in an attempt to optimize the system. We define informed drivers as the ones who are given predictive route guidance from a system manager (e.g., traffic operation center) through, for example, global positioning system (GPS)-based applications and assume that these drivers will make a bounded route choice with the provided guidance. Informed drivers are expected to comply with the provided guidance if they are given sufficient incentives and/or if the new route is not noticeably different from the original choice in terms of the cost. Such compliance will become more practical with shared autonomous vehicles that are expected to lower traveler's disutility of travel time through credits from the company for following those suggestions.

The role of information is especially relevant under expected and unexpected disruptions to infrastructure. Transportation networks are commonly impacted by short-term and long-term disruptions caused by natural or man-made events. For example, a multi-day construction zone on a highway can increase the travel time if travelers continue to follow the same route. Similarly, a post disaster event such as flooding of neighborhood streets or a tree collapse may result in reduced capacity on certain links.

The methods and systems described in this document use a mixed information framework for providing within-day route suggestions to informed drivers using predicted information about the time-varying route habits of uninformed drivers. The informed users detour from initially proposed routes to minimize network congestion after traffic disruptions, pushing the system toward optimal equilibrium, while uninformed drivers make day-to-day decisions which push the system toward user equilibrium.

Figure 1:
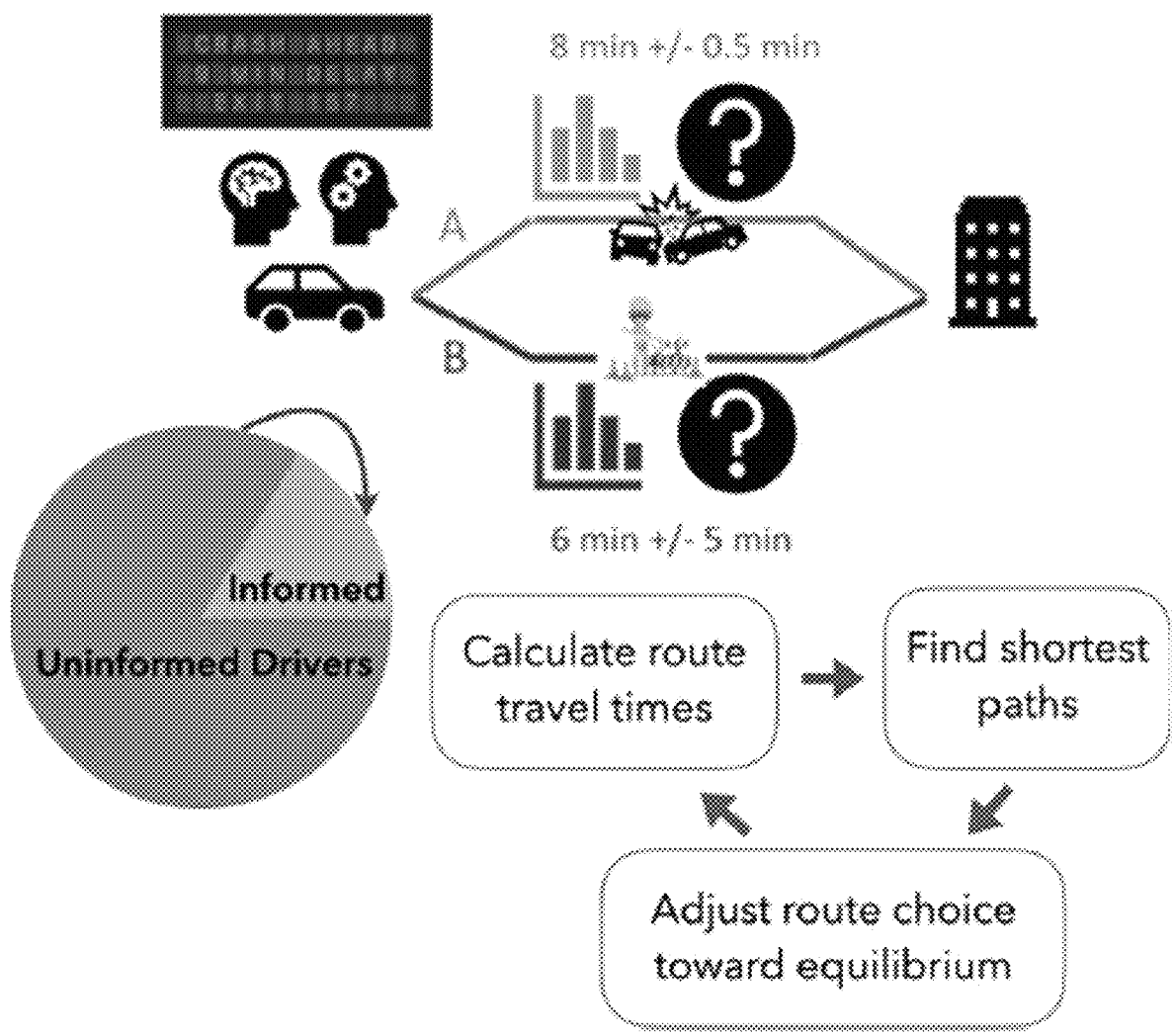
FIG. 1 is a diagram illustrating an example mixed objective framework that provides a method for a group of informed drivers to reduce congestion.

FIG. 1 is a diagram illustrating an example mixed objective framework that provides a method for a group of informed drivers to reduce the within-day congestion caused by uninformed drivers who are making choices based on day-to-day habits on route and departure time after a traffic disruption. Informed drivers are provided with the within-day route guidance based on the anticipated behaviors of uninformed drivers on the network day-to-day, by adjusting route choices toward system optimum.

In some cases, the day-to-day evolution of traffic flows follows the same framework as the iterative process of DTA models and accurately simulates the iterative day-to-day transition of the adaptive and bounded behavior of uninformed drivers during the disruption of a transportation network. The resulting congestion patterns are caused by uninformed drivers' discrete decision-making processes before reaching equilibrium.

The day-to-day decision-making of uninformed drivers may result in congestion depending on levels of perturbations and network congestion. The systems and methods described in this document can be used to reduce the congestion caused by uninformed users making day-to-day decisions by strategically rerouting informed drivers. The within-day traffic dynamics are incorporated into the simulation at the end of the day to reoptimize (for example, offline) next day's informed driver strategy considering day-to-day dynamics of uninformed drivers. For an application to a post disaster event, day 1 of the model is after loading within-day travel behaviors of the day of the collapse. The methods and systems can be applied to inform human drivers, Connected Autonomous Vehicles (CAVs) operating in mixed autonomy networks, or both.

Figure 2:
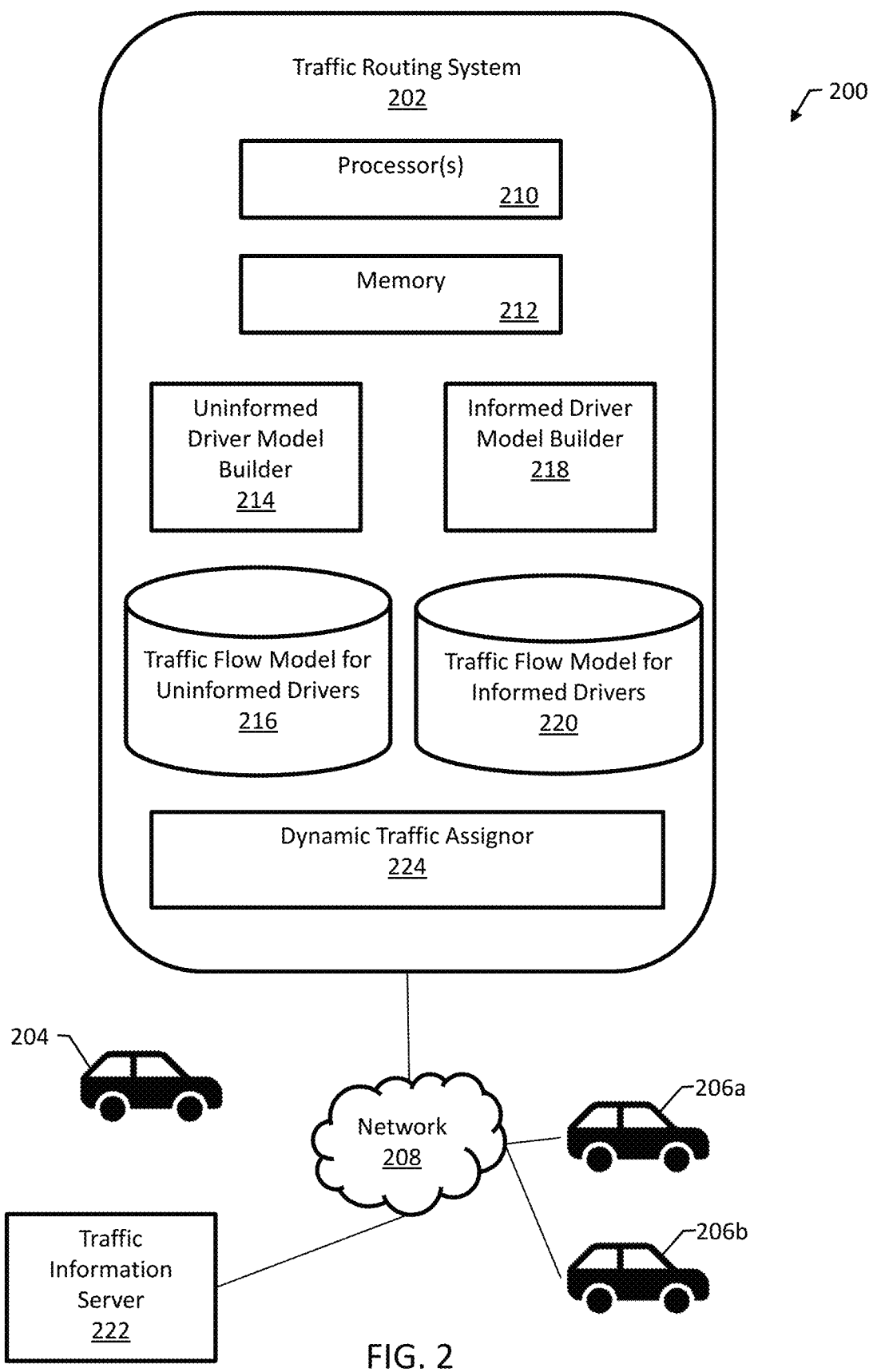
FIG. 2 is a block diagram of an example system for dynamically providing routes to users of vehicles.

FIG. 2 is a block diagram of an example system 200 for dynamically providing routes to users of vehicles. The system 200 includes a traffic routing system 202 configured for modeling the behavior of uniformed drivers 204 and providing routes to informed drivers 206a-b over a network. The traffic routing system 202 can provide routes over a data communications network 208, e.g., a cellular telecommunications network that communicates wirelessly with computing devices in the vehicles 206a-b. The traffic routing system 202 can provide routes to vehicles 206a where the driver is using a navigation system, to vehicles 206b that are operating autonomously, or both.

The traffic routing system 202 includes one or more processors 210 and memory 212 storing executable instructions for the one or more processors 210. In operation, the traffic routing system 202 implements a dynamic traffic router using the processors 210 and memory 212 for sending dynamic routes to the informed drivers 206a-b.

The traffic routing system 202 includes an uninformed driver model builder 214 configured for determining a traffic flow model 216 for the uninformed drivers 204. Determining the traffic flow model 216 can include determining the first traffic flow model comprises determining a dynamic network loading (DNL) model using a day-to-day boundedly rational dynamic user equilibrium (BRDUE) algorithm. Determining the dynamic network loading (DNL) model using the day-to-day boundedly rational dynamic user equilibrium (BRDUE) algorithm comprises selecting one or more routes based on at least one simulated effective path delay. Further examples regarding the traffic flow model 216 for the uninformed drivers 204 is provided below.

The traffic routing system 202 includes an informed driver model builder 218 configured for determining a traffic flow model 220 for the informed drivers 206a-b. The informed drivers 206a-b make driving decisions based on receiving dynamic routes from the traffic routing system 202. The informed driver model builder 218 is configured for iteratively updating the traffic flow model 220 using the traffic flow model 216 for the uninformed drivers 204 until a convergence criterion is met.

Determining the traffic flow model 220 can include determining a dynamic network loading (DNL) model using a within-day dynamic system optimal (DSO) algorithm. Determining the dynamic network loading (DNL) model using the within-day dynamic system optimal (DSO) algorithm can include selecting one or more routes based on at least one path marginal cost (PMC). Iteratively updating the second traffic flow model can include iteratively updating, for each route of a plurality of routes, a demand for the route. Iteratively updating the second traffic flow model can include determining a route decision for at least one informed driver using an informed driver Mlogit model. Further examples regarding the traffic flow model 220 are provided below.

The traffic routing system 202 receives updated traffic data from a traffic information server 222. The traffic information server 222 can provide any appropriate information regarding traffic flow for the uninformed driver model builder 214 and the informed driver model builder 218. For example, the traffic information server 222 can provide live traffic flow data, e.g., from navigation systems in the vehicles 206a-b of the informed drivers. In another example, the traffic information server 222 can provide updates regarding road closures.

The traffic routing system 202 includes a dynamic traffic assignor 224 configured for sending, to one or more informed drivers 206a-b, dynamic routes using the traffic flow model 220. Sending a dynamic route can include sending the dynamic route to a navigation system in a vehicle 206a of an informed driver, causing the navigation system to present the dynamic route to the informed driver. Sending a first dynamic route comprises sending the first dynamic route to an autonomous driving system 206b for the at least one informed driver.

The traffic routing system 202 is illustrated in FIG. 2 as being a single computing system; however, in operation, various functions of the traffic routing system 202 can be distributed. For example, the model builders 214 and 218 can be implemented in a separate system from the dynamic traffic assignor 224, such that model building is performed offline and dynamic traffic assignment is performed by a separate system serving users.

In some examples, the model builders 214 and 218 can be implemented using parallel processing. An additional convenient property of the WD DSO methodology is that it is easily parallelized, allowing further computational improvements over the serial method. The ease of parallelization comes from the fact that each calculation of PMC only considers the effect of one path and departure time on all other paths and departure times. Each PMC calculation is independent of other PMC calculations. Therefore, parallelization can be applied to make the problem more computationally tractable.

Figure 3:
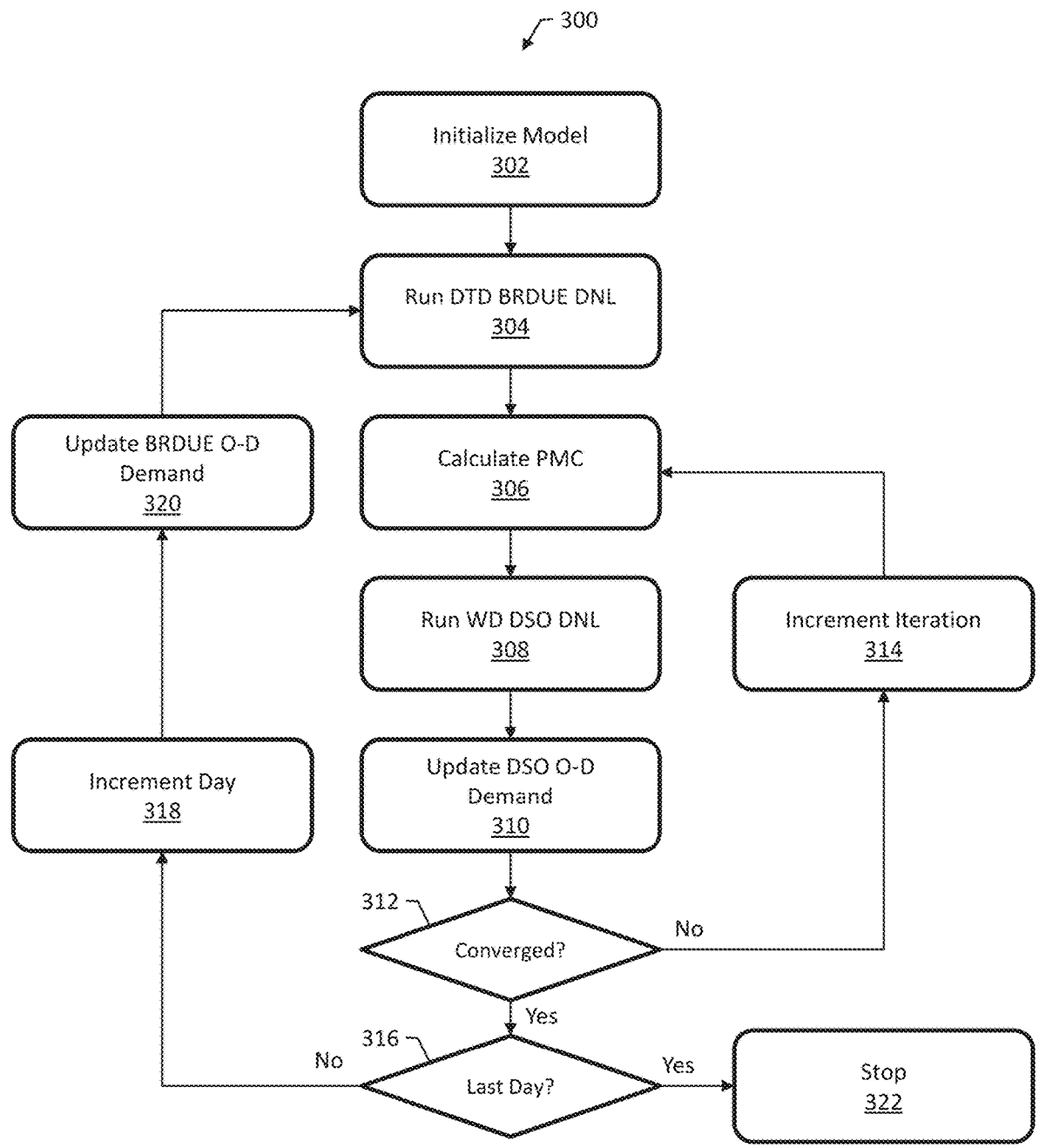
FIG. 3 is a flow diagram of an example method for determining traffic flow models that contain a mixture of informed and uninformed drivers with different routing behaviors towards reaching equilibrium across different time scales.

FIG. 3 is a flow diagram of an example method 300 for determining traffic flow models that contain a mixture of informed and uninformed drivers with different routing behaviors towards reaching equilibrium across different time scales. Uninformed drivers make their route and departure time choices based on the memory of their own prior effective travel cost and selfishly seek to minimize their own travel time.

If all drivers are uninformed, the route choices will iteratively converge to the BRDUE conditions. The informed drivers in the presented model can be, for example, accessing an app, which they use to determine their route and departure time choice. The informed drivers make within-day decisions based on the information presented by the app, which suggests the best routes based on the predicted network state for that day. Unlike the uninformed drivers, informed drivers are given routes that seek to push the system toward WD DSO equilibrium. Informed drivers' route and departure time choices are calculated using a separate within-day DNL procedure. The within-day DNL procedure is used to calculate the PMC for each route and departure time. PMC considers the additional delay on all other drivers when an informed driver chooses a given route and departure time.

Group 1 (Uninformed): Choose route and departure time based on Effective Path Delay, using DTD BRDUE DTA algorithm, influenced the transition between the presence of perturbations and after removal of perturbations. Drivers are selfishly seeking to minimize their own travel time.

Group 2 (Informed): Choose route and departure time using a smart phone navigation app, or other appropriate navigation system, which suggests routes with the least PMC. This is calculated using a within-day DTA algorithm. These drivers are directed to push the system toward DSO, mitigating congestion caused by the inability of uninformed drivers to predict perturbations in the network.

The extent to which Group 2 (Informed drivers) can be rerouted is subject to additional constraints based on information gained for other informed drivers and their own indifference bands. Informed drivers should be convinced to choose a system optimal route and, in some cases, it will only work over time if the maximum deviation from a user optimal route is within their indifference band, which is defined as a range of total travel times over which the informed travelers are indifferent.

For example, if the shortest travel time at DUE between an OD pair is Z units and the indifference band for an informed traveler is z units, then informed travelers are convinced to switch their routes and departure times based on their experienced travel time such that their resulting travel time is at most Z+z. In some example, the range of indifference band is up to 400 seconds.

The method 300 starts from the initialization of the demand for each O-D pair at each departure time without informed drivers switching routes (302), run day to day and within-day DNL until the minimum solution is found in DSO with informed drivers strategy for a fixed number of days. The method 300 includes running the DTD BRDUE DNL model (304) and then calculating a path marginal cost (306). The method 300 includes running the WD DSO O-D DNL model (308) and updating the DSO O-D demand values (310). The method 300 includes checking if a convergence criterion is met (312), and if not, incrementing an iteration (314) and repeating the calculation of PMC, running the WD DSO DNL model, and updating the DSO O-D demand.

If the convergence criteria is met, the method 300 includes checking if a last day has been reached (316), e.g., a last day specified by a system operator. If so, then the method 300 stops (322). If not, then the method 300 includes incrementing the day (318), updating the BRDUE O-D demand values, and repeating the method 300 starting from running the DTD BRDUE DNL (304).

FIG. 4 shows a table of notations that summarizes the notations used in this document. The following sections describe examples of building traffic flow models for uninformed drivers and informed drivers.

Dynamic Network Loading Model

Consider a traffic network represented by a directed graph $G=(\mathcal{N}, \mathcal{L})$ consisting of set $\mathcal{N}$ of all nodes, and set $\mathcal{L}$ of all directed links. The network is dynamic where set T denote the set of all discrete time interval indices ranging from $1, 2, \ldots, |T|$, where each interval is one time unit wide; for our experiments, we consider each time unit to be 6 seconds.

Let $\mathcal{P} \subseteq N^2$ denote the set of all OD pairs with positive demand. In our model, travelers between an OD pair choose the departure time and routes. Denote by $d_{rs}$ the total demand traveling from node r to node s (assumed to be known apriori). Let $K_{rs}$ denote the set of all routes connecting OD pair $[r, s] \in \mathcal{P}$ where each route $k \in K_{rs}$ is an ordered sequence of links appearing from start to end. Let $K = \cup_{[r,s] \in \mathcal{P}} K_{rs}$ be the set of all routes in the network. The flow from node r to node s departing at time t via route $k \in K_{rs}$ is denoted by $h_k(t)$. Equation (1) defines the flow conservation for each OD pair.

$$d_{rs} = \Sigma_{t \in T} \Sigma_{k \in K_{rs}} h_k(t) \; \forall [r, s] \in \mathcal{P} \quad (1)$$

Next, we describe the dynamic network loading model. Equation 2 denotes the link occupancy, or the number of vehicles on a given link $l \in \mathcal{L}$ at time $t \in T$, which is the difference between the cumulative arrival and departure curves $A_l(t)$ and $D_l(t)$.

$$o_l(t) = A_l(t) - D_l(t) \; \forall l \in \mathcal{L}, t \in T \quad (2)$$

The density $\rho_l(t)$ on link l at time t is denoted by Equation 3 as a function of the number of lanes on the link (denoted by $n_l$) and the length of the link (denoted by $L_l$).

$$\rho_l(t) = \frac{o_l(t)}{n_l L_l} \quad (3)$$

This density function can be generalized for any spatial location x measured along the length of a link l at time t, represented as $\rho_l(t, x)$, by taking the limit of the ratio of total time with the total area in the time space diagram as the area of the region becomes infinitely close to zero centered at point (t, x).

Models for traffic flow determine the variation of density for different times and locations. The Lighthill-Whitham-Richards (LWR) model assumes a deterministic relationship between density and flow expressed as fundamental diagram and denoted by $f_l(\bullet)$ for all links $l \in \mathcal{L}$. Incorporating the conservation of vehicles, the partial differential equation (PDE) in Equation 4 is then used to calculate dynamics of density and flow across each link:

$$\partial_t \rho_l(t, x_l) + \partial_x f_l(\rho_l(t, x_l)) = 0 \; x_l \in [a_l, b_l], \; \forall t \in T \text{ and } l \in \mathcal{L} \quad (4)$$

where $x_l$ is any point along the length of the link $l \in \mathcal{L}$ with $a_l$ and $b_l$ denoting the start and end points of the link (assuming a parameterized curve that represents a link in two dimensions).

Figure 5:
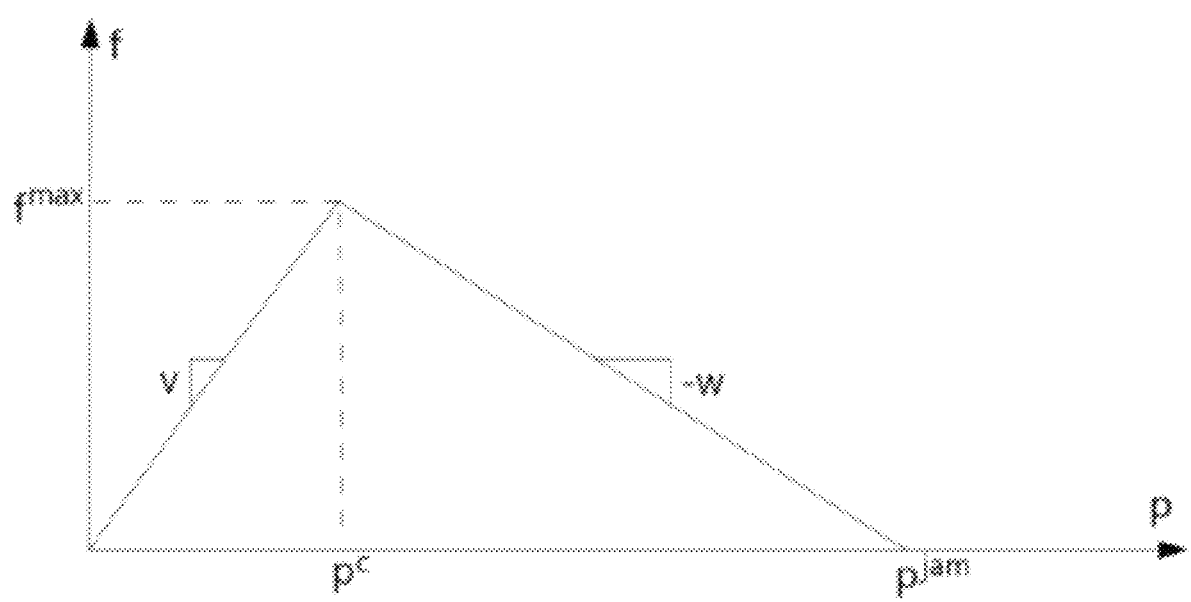
FIG. 5 shows the triangular fundamental diagram.

In our model, we assume the flow function $f_l(\bullet)$ in the LWR model is given by a triangular fundamental diagram as shown in FIG. 5. This fundamental diagram uses two linear functions to approximate the relationship between flow and density on any given link. The intercept of the two functions is the critical density $\rho_l^c$ for the link, while the jam density $\rho_l^{jam}$ is the location where the function with a negative slope intersects the density axis. Using the triangular fundamental diagram, the flow for a given density, forward wave speed v, and backward wave speed w is given by Equation 5.

$$f_l(\rho) = \begin{cases} v\rho & \rho \in [0, \rho_l^c] \\ -w(\rho - \rho_l^{jam}) & \rho \in [\rho_l^c, \rho_l^{jam}] \end{cases} \quad (5)$$

To solve the PDE in Equation 4 we need to know the time-varying rates of maximum flow that can enter each link (link demand) and the time-varying rates of maximum flow that can exit each link (link supply). The time-varying supply and demand functions for each link, denoted by $S(\rho_l(t))$ and $D(\rho_l(t))$ respectively, can then be approximated using the triangular fundamental diagram, where C is the link capacity.

$$D(\rho_l(t)) = \begin{cases} v\rho_l(t) & \rho < \rho_l^c \\ C & \rho \geq \rho_l^c \end{cases} \quad (6)$$

$$S(\rho_l(t)) = \begin{cases} C & \rho < \rho_l^c \\ -w(\rho_l(t) - \rho_l^{jam}) & \rho \geq \rho_l^c \end{cases} \quad (7)$$

The flow model on each link can be extended to networks with multiple links meeting at junctions, which are nodes with at least one incoming and one outgoing link. Let $\mathcal{J} \subseteq \mathcal{N}$ denote the set of all junctions. For a given junction $n \in \mathcal{J}$, conservation of flow across all links is given by Equation 8 which can be used as additional boundary condition to solve the combined PDEs for each incoming and outgoing link:

$$\Sigma_{m \in M_n} f_m(\rho_m(t, b_m)) = \Sigma_{q \in Q_n} f_q(\rho_q(t, a_q)) \; \forall t \in T, n \in \mathcal{J} \quad (8)$$

To prevent confusion, subscripts m or q are used in this document to indicate the association with inlink m or outlink q.

Various junction dynamics determine how flows split at each junction. In our model, we consider a path-based DNL that tracks flow on each path. The decision making of users who pass through each junction are considered in FIG. 6 to calculate the actual supply and demand on each of the connecting links. This is accomplished by calculating the proportion of users on an incoming link $m \in M$ who will select the outgoing link $q \in Q$. Given the cumulative arrival and departure curves, it is possible to determine an entry time for each link $\tau_m(t)$ based on the exit time (t) for a link m. Let $\gamma_{m,k}(t, b_m)$ denote the proportion of flow leaving link m from its exit point $b_m$ along route k at time t. Following the first-in-first-out principle and using the link entry time for a given exit time, the proportional contribution of an individual path flow to the total flow on a given link at time t can be estimated as follows:

$$\gamma_{m,k}(t, b_m) = \gamma_{m,k}(\tau_m(t), a_m) \quad (9)$$

Figure 6:
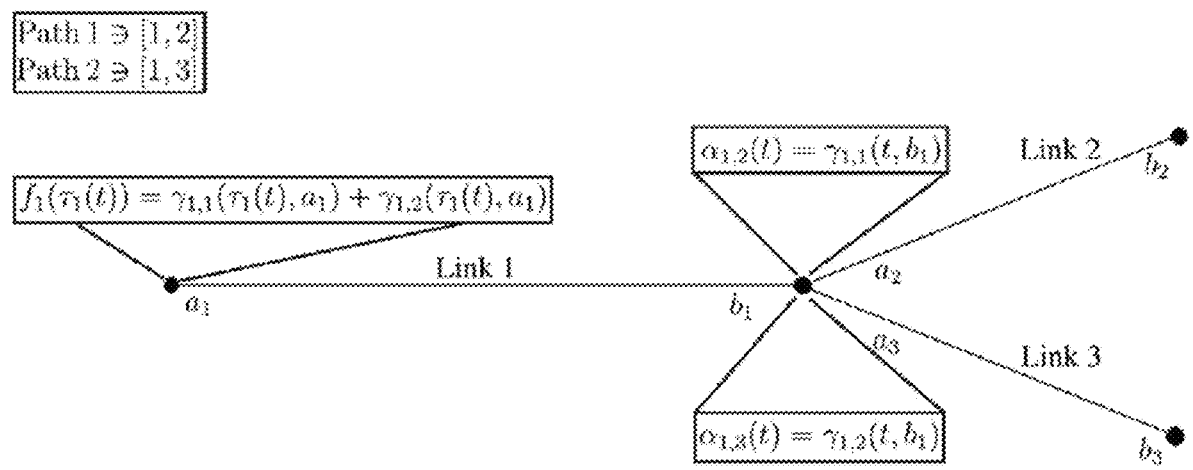
FIG. 6 shows an example of junction dynamics.

In other words, the proportion of flow leaving link m along path k at time t is equal to the proportion of flow entering link m at time $\tau_m(t)$. The sum of these proportions on link m over each path containing two connected links m and q gives the total proportion $\alpha_{m,q}(t)$ of flow entering link q from link m at time t as shown in FIG. 6. That is, $$\alpha_{m,q}(t) = \Sigma_{\forall k \ni m, q} \gamma_{m,k}(t, b_m) \quad (10)$$

A distribution matrix $\mathcal{A}^n(t)$, for a junction $n \in \mathcal{J}$ satisfying conservation of flow in Equation 8, is then constructed in Equation 11 to track the distribution of flows between incoming and outgoing links.

$$\mathcal{A}^n(t) = \{\alpha_{m,q}(t)\} \forall m \in M_n, q \in Q_n, n \in \mathcal{J} \quad (11)$$

The non-junction nodes such as source nodes with no incoming links and sink nodes with no outgoing links consider a simplified traffic dynamics. Sink nodes are assumed to have infinite sink capacity allowing the flow on routes terminating at the sink node to exit. On contrary, source nodes may not be able to load the entire demand if the outgoing links experience queue spillback. A point-queue model is used to account for the dynamics at origin nodes (which includes source nodes or junctions that also act as origins). In the following sections, examples of the uninformed and informed driver models are described.

Uninformed Driver Model

We model the day-to-day behavior of drivers after a disruption to the network where drivers adapt their departure time and route choice. Let $\mathcal{D}$ denote the set of days post disruption indexed by d ranging from $1, 2 \ldots, |\mathcal{D}|$. The update dynamics of departure time and route choice for uninformed drivers is governed by an iterative structure where travelers adapt their routes to converge to the new post-disruption equilibrium. We approximate this dynamic using a multinomial Logit model described next.

First, to circumvent exponentially high number of routes, we narrow the set of possible routes over which travelers consider updating their routes. We define canonical routes as the set of routes that deviate from the fastest path (i.e. minimum travel time path) within a specified tolerance. For a traveler departing from O-D pair $[r, s] \in \mathcal{P}$ at time $t \in T$, the set of canonical routes is denoted by $\mathcal{R}_{rs}(t)$ and is defined as following:

$$\mathcal{R}_{rs}(t) = \left\{ k \mid k \in K_{rs}, \frac{TT_k(t) - TT_{rs}^*(t)}{TT_{rs}^*(t)} \leq \Theta \right\} \quad (12)$$

where $TT_k(t)$ is the travel time on route k for departure time t, $TT^*_{rs}(t)$ is the travel time on the time-dependent shortest path connecting O-D pair $[r, s] \in \mathcal{P}$ for departure time $t \in T$, and $\Theta$ is the driver's perception deviance. We assume $\Theta$ to be fixed across all travelers. We note that the canonical route set is time-dependent since shortest path may be different for different departure times.

Building on the BRDUE model, we update the route and departure time decisions for uninformed drivers using a Multinomial Logit Model (Mlogit). Let $(k, t)_d$ denote the choice tuple representing the route and the departure time on day $d \in \mathcal{D}$. After executing the select choices on a given day, travelers update their choices $(k, t)_{d+1}$ for the next day using the MLOGIT model.

The utility of a choice is approximated using the perceived cost of each route and departure time choice for every O-D pair. We assume homogeneity across all travelers between an origin-destination pair.

The perceived cost for each route and departure time, in terms of both travel time and schedule delay (early or late arrival), is calculated in Equation 13:

$$PC_k(t) = TT_k(t) + SCD_k(t) \; \forall k \in K, t \in T \quad (13)$$

where $SCD_k(t)$ is the schedule delay cost for path k and departure time t, given by Equation 14, $$SCD_k(t) = \begin{cases} \phi_e(AT_k(t) - TA_{rs}) & \text{if } AT_k(t) \le TA_{rx} \\ \phi_l(AT_k(t) - TA_{rs}) & \text{if } AT_k(t) > TA_{rx} \end{cases} \forall\ k \in K_{rs},\ [r,s] \in \mathcal{P},\ t \in T \quad (14)$$

where $AT_k(t) = t + TT_k(t)$ is the actual arrival time at the destination for route k and departure time t, $TA_{rs}$ is the desired arrival time for all travelers associated with the OD pair [r,s] (a single value assumed to be known apriori for each OD pair), $\phi_e$ is the coefficient of early arrival penalty, and $\phi_l$ is the coefficient of late arrival penalty. Equation 13 can now be incorporated into the Mlogit model.

The Mlogit model estimates the probability of choosing an alternative given the utilities across all alternatives. Let $C_{rs}$ be the set of all alternatives for all travelers across an OD pair $[r,s] \in \mathcal{P}$, defined as follows:

$$C_{rs} = \{(k,t) | k \in \mathcal{R}_{rs}(t), t \in T\}$$

For the Mlogit model, the utility of an alternative $(k, t) \in C_{rs}$ is given by $U_{(k,t)} = -PC_k(t) + \varepsilon_{(k,t)}$, where $\varepsilon_{(k,t)}$ are the error terms associated with the utilities that are assumed to be independent and identically distributed as a Gumbel distribution with a scale parameter $\theta > 0$ and location parameter assumed to be 0. Given the assumptions, the probability of choosing alternative $(k, t) \in C_{rs}$ for travelers between OD pair [r, s] is given by:

$$\mathbb{P}_{(k,t)} = \mathbb{P}\left(U_{(k,t)} > \max_{\substack{(k',t') \in C_{rs} \\ (k',t') \ne (k,t)}} U_{(k',t')}\right) = \frac{\exp(-\theta PC_k(t))}{\sum_{(k'',t'') \in C_{rs}} \exp(-\theta PC_{k''}(t''))} \quad (15)$$

and the path flows for a given departure time is computed as:

$$h_k(t) = d_{rs} \mathbb{P}_{(k,t)} \quad \forall (k, t) \in C_{rs},\ [r,s] \in \mathcal{P} \quad (16)$$

To model the boundedly-rational behavior of travelers, we consider an indifference band $\Delta$ that increases the utility of current alternative thus increasing the likelihood that the traveler continues to stay on the currently chosen alternative over the next day. Adding a superscript d denoting the day of travel, we denote by $h_k^d(t)$ the number of travelers choosing route k at time t on day d. We can then update the flow on next day d+1, by considering the current flow on alternative (k, t) that continues to stay with the same alternative, and the flow from all other alternatives (k', t') that switch to the alternative (k, t).

Equation 17 shows the update of flow from one day to the next.

$$h_k^{d+1}(t) = h_k^d(t) \mathbb{P}_{(k,t) \leftarrow (k,t)} + \sum_{\substack{(k',t') \in C_{rs} \\ (k',t') \ne (k,t)}} h_{k'}^d(t') \mathbb{P}_{(k,t) \leftarrow (k',t')} \quad (17)$$

where $\mathbb{P}_{(k,t) \leftarrow (k,t)}$ is the probability that travelers choosing alternative $(k, t) \in C_{rs}$ will continue with the same alternative on the next day, computed as:

$$\mathbb{P}_{(k,t) \leftarrow (k,t)} = \frac{e^{(-\theta \times (PC_k(t) - \Delta))}}{e^{(-\theta \times (PC_k(t) - \Delta))} + \sum_{\substack{(k'',t'') \in C_{rs} \\ (k'',t'') \ne (k,t)}} e^{(-\theta \times PC_{k''}(t''))}} \quad (18)$$

and $\mathbb{P}_{(k,t) \leftarrow (k',t')}$ is the probability that travelers choosing alternative $(k', t') \in C_{rs}$ will switch their alternative to $(k, t)$ on the next day, computed as:

$$\mathbb{P}_{(k,t) \leftarrow (k',t')} = \frac{e^{(-\theta \times PC_k(t))}}{e^{(-\theta \times (PC_{k'}(t') - \Delta))} + \sum_{\substack{(k'',t'') \in C_{rs} \\ (k'',t'') \ne (k',t')}} e^{(-\theta \times PC_{k''}(t''))}} \quad (19)$$

It is easy to verify that if $\Delta = 0$, then $\mathbb{P}_{(k,t) \leftarrow (k',t')} = \mathbb{P}_{(k,t) \leftarrow (k,t)} = \mathbb{P}_{(k,t)}$, and Equation 17 reduces to Equation 16.

Informed Driver Model

Informed drivers in the presented model are given route suggestions that minimize a cost function representing the total system cost. These users seek to reduce congestion faced by all other drivers in the network, but without noticeably penalizing themselves. Such a cost function needs to consider both the system-level cost and the cost to the user when selecting a path and departure time.

In some examples, the system 202 can use a utility function in building the informed driver model. The utility function considers the travel cost and the benefit in terms of information gained for other drivers in the network. An example utility function is provided below.

$$U_{i,k} = PTT_{i,k} - (\alpha/|K|) \sum_{j \in x^i(t)} \delta\sigma(k_i, k^*_{j \in x^i(t)} | Y, \Psi)$$

where $k_i$ is route for driver i, $k^*_i$ is a canonical route for driver j, and $\delta\sigma(k_i, k^*_{j \in x^i(t)} | Y, \Psi)$ is the variance reduction (e.g., information gain) of $k^*$ for driver $j \in x^i(t)$ on link i when driver j runs some other route k given current driver's observation Y and other drivers' observations $\psi$ under the traffic data variance $\sigma$ (e.g., standard deviation of travel time) with weights on the observation $\delta$ (e.g., number of samples), where $x^i(t)$ is a list of all drivers using link i. The utility function $U_{i,k}$ is the difference between PTT and the benefit of information gain to all other drivers when driver j takes a detour from path $k^*$ to k to gather information. These utility functions perform best under information sharing frameworks and simulations with large amounts of uncertainty. The example utility function presented above can be used to strategically alter the behavior of informed drivers by considering the trade-off of exploration and exploitation. The route with minimum disutility is presented to the informed driver, e.g., through a route suggestion app as being the most preferable route.

DSO Computation

Let $h = \{h_k(t) | k \in K, t \in T\}$ denote the departure-rate pattern as a vector of all path flows at different departure times. The DSO formulation is defined using the following optimization problem $$\min_h \left( TSC = \sum_{k \in K} \sum_{t \in T} h_k(t) \times PC_k(t) \right) \quad (20)$$

subject to the following constraints:

$$\sum_{t \in T} \sum_{k \in K_{rs}} h_k(t) = d_{rs} \forall\ [r, s] \in \mathcal{P} \quad (21)\ \text{and}\ (22)$$

$$h_k(t) \geq 0 \forall\ k \in K,\ t \in T$$

where $h_k(t)$ is the departure rate, and $PC_{k,t}$ is the perceived cost for route k at time t, and TSC is the total system cost.

A departure rate pattern h is a DSO solution if and only if it is equilibrated based on the corresponding path marginal cost (PMC). The PMC is defined as the increase in total system cost incurred when an additional unit of flow is added to the departure rate pattern $h_k(t)$. The PMC for route k at time t is calculated in Equation 23:

$$PMC_{k,t} = \frac{\partial TSC}{\partial h_k(t)} = PMC_{k,t}^{TT} + PMC_{k,t}^{SCD} + PC_k(t) \quad (23)$$

where $PMC_{k,t}^{TT}$ is the change in travel time cost for all other users caused by additional flow on route k at time t, $PMC_{k,t}^{SCD}$ is the change in schedule delay cost for all other traffic caused by the additional flow on route k at time t, and $PC_k(t)$ is the perceived cost for an individual on route k at time t (Equation 13).

Naïvely using a DNL algorithm to calculate the PMC for each path and departure time can be computationally demanding. For a set of all time periods, the naïve method requires |z,900 |×|T| DNL solutions per DSO iteration.

In some examples, we approximate the $PMC_{k,t}^{TT}$ using the Bureau of Public Roads (BPR) function since solving the exact path marginal cost is complex due to the non-linear nature of the DNL procedure. While actual DNL is used for daily simulation of revised change in flow, the cost incurred by each traveler's route and departure time choice is estimated with revised BPR function.

Let's assume that an estimate for the travel time on route k at departure time t can be calculated using the BPR function:

$$TT_k(t) \approx t_{0,k} \times \left[ 1 + \alpha \left( \frac{h_k(t)}{C_k} \right)^\beta \right] \quad (24)$$

where $t_{0,k}$ is the free flow travel time (defined as the sum of free flow travel time on path links), $h_k(t)$ is the flow (e.g., veh/hr) on route k at time t, $C_k$ is the capacity of route k, and $\alpha$ and $\beta$ are parameters. We define $C_k$ to be the minimum capacity across all links along the path.

While the congested links and time of congestion are computed from DNL, we consider the revised BPR to approximate the change in cost to all other paths due to change in flow on path k. To compute the impact of one unit of flow with and without the presence of congestion, we find all the paths that go through congested links in route k and iterate through all of the links in route k. Once the value of $PMC_{k,t}^{TT}$ is approximated, the revised destination arrival time is estimated at the destination of route k for a departure time t, and the new value of $PMC_{k,t}^{SDC}$ is approximated using Equation 14 as before.

In some examples, substantial computational improvements are made by only calculating PMC for paths and times which incur congestion and which propagate congestion onto other paths and departure times. This is accomplished by avoiding computing PMC for all uncongested paths and times, since these paths and times are assumed to be traversed at the free flow travel time and have no marginal cost on other paths or departure times. In addition, no PMC calculations are required for other paths and departure times which are unaffected by congestion on a given path at a given time. As shown in the triangular fundamental diagram (Equation 5), there is no impact of an additional vehicle below critical density for the link. Using these methods, the total number of paths and departure times requiring PMC calculation is minimized for a given spatiotemporal distribution of congestion in the network. After PMC for each path is solved, informed drivers make an updated decision using the Informed Driver Mlogit Model (IDMM) described in the next subsection, then the DNL model is executed to generate a new congestion pattern based on the decisions of informed drivers.

Informed Driver Mlogit Model (IDMM)

Finding DSO for informed drivers requires multiple iterations of route and departure time decisions. Unlike the MSA and some conventional quadratic programming models, in each subiteration i of DSO computations route and departure time decisions for informed drivers are made using the Mlogit model. Mlogit models are used for alternative-invariant problems, meaning that the regressor does not vary over the alternatives but does vary over the individual. Since the PMC already accounts for the effect that selecting an alternative has on all other alternatives and presents it as a cost which varies only over the individual, the IDMM described in this section can be treated as alternative-invariant.

Informed drivers also consider route choice over a limited canonical set of routes as defined in Equation 12. For the informed drivers, the utility of an alternative $(k,t) \in C_{rs}$ is given by $U_{(k,t)} = -PMC_{k,t} + \varepsilon_{(k,t)}$. The PMC for each path k and departure time t available to the O-D pair p is calculated for use in the IDMM. As in the previous section, the selection of base alternative for each solution is sequentially selected from the set of paths between the O-D pair and the set of possible departure times.

$$PMC_{k,t} = PC_k(t) + PMC_{k,t}^{TT} + PMC_{k,t}^{SCD} \quad (25)$$

where $PMC_{k,t}^{SCD}$ is the sum of schedule delays (Equation 14) for all other paths and departure times when 1 additional unit of flow is added to path k at time t, $PMC_{k,t}^{TT}$ is the cost in terms of travel time for all other paths and departure times when 1 additional unit of flow is added to path k at time t, and $PC_k(t)$ is the perceived cost of current flow on path k at time t. Therefore, $PMC_{k,t}$ is the marginal cost of path k at time t on all other paths and departure times. We can add travel time without schedule delays because if drivers arrive within the desired arrival time window, there is no penalty, however, if not, those will be in the later time window. Having many drivers departing at the same time as an aggregate will incur congestion, which we want to avoid.

The update of flow from one iteration to the next is governed by the IDMM model. For each OD pair $[r, s] \in \mathcal{P}$, the model computes the probability of switching from all other route-departure time tuples $(k', t') \in C_{rs}$; $(k', t') \neq (k, t)$ to a given alternative tuple $(k, t) \in C_{rs}$. The total probability of choosing route k and departure time t in the next iteration also includes the proportion of drivers who already selected route k at time t and choose not to detour or adjust their departure time. Similarly to the uninformed model, a constant scaling parameter $\theta_2$ (0.04) is used for distribution of utility errors, along with the BR switching threshold $\Delta_2$ (800 seconds), which still applies to informed drivers since not all drivers will be convinced to switch when provided with a predictive alternate route.

Path flow update from iteration i to i+1 for computing DSO is computed as follows. First, adding a superscript i, DSO denoting the subiteration of DSO computation, we denote by $h_k^{i,DSO}(t)$ the number of travelers choosing route k at time t in DSO iteration i. We can then update the flow on next iteration i+1, by considering the current flow on alternative (k, t) that continues to stay with the same alternative, and the flow from all other alternatives (k', t') that switch to the alternative (k, t). We assume that the uninformed driver flow is unaffected and remains constant in the background for each DSO iteration.

Equation 26 shows the update of flow from one iteration to the next.

$$h_k^{i+1,DSO}(t) = h_k^{i,DSO}(t)\mathbb{P}_{(k,t)\leftarrow(k,t)}^{DSO} + \sum_{\substack{(k',t')\in C_{rs} \\ (k',t')\neq(k,t)}} h_{k'}^{i,DSO}(t')\mathbb{P}_{(k,t)\leftarrow(k',t')}^{DSO} \quad (26)$$

where $\mathbb{P}_{(k,t)\leftarrow(k,t)}^{DSO}$ is the probability that travelers choosing alternative (k, t) ∈ $C_{rs}$ will continue with the same alternative in the next DSO iteration, computed as:

$$\mathbb{P}_{(k,t)\leftarrow(k,t)}^{DSO} = \frac{e^{(-\theta_2 \times (PMC_{k,t} - \Delta_2))}}{e^{(-\theta_2 \times (PMC_{k,t} - \Delta_2))} + \sum_{\substack{(k'',t'')\in C_{rs} \\ (k'',t'')\neq(k,t)}} e^{(-\theta_2 \times PMC_{k'',t''})}} \quad (27)$$

and $\mathbb{P}_{(k,t)\leftarrow(k',t')}^{DSO}$ is the probability that travelers choosing alternative (k', t') ∈ $C_{rs}$ will switch their alternative to (k, t) in the next DSO iteration, computed as:

$$\mathbb{P}_{(k,t)\leftarrow(k',t')}^{DSO} = \frac{e^{(-\theta_2 \times PMC_{k,t})}}{e^{(-\theta_2 \times (PMC_{k',t'} - \Delta_2))} + \sum_{\substack{(k'',t'')\in C_{rs} \\ (k'',t'')\neq(k',t')}} e^{(-\theta_2 \times PMC_{k'',t''})}} \quad (28)$$

The iterative process of shifting travelers along different alternatives continues until convergence criteria is met. For example, the process can terminate after a fixed number of DSO iterations.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for dynamically providing routes to users of vehicles, the method comprising:
   providing, by a traffic routing system including one or more processors and a memory, an uninformed driver model builder implemented using the one or more processors for building a first traffic flow model implemented using the one or more processors for modeling vehicle route and departure time choices of a first plurality of uninformed drivers of vehicles who make vehicle route and departure time choices based on memory of the uninformed drivers and to minimize travel times of the uninformed drivers;
   providing, by the traffic routing system, an informed driver model builder implemented using the one or more processors for building a second traffic flow model implemented using the one or more processors for modeling vehicle route and departure time choices of a plurality of informed drivers of vehicles who make the vehicle route and departure time choices using dynamic routes received from the traffic routing system and the dynamic routes are configured to achieve a within day (WD) dynamic system optimal (DSO) equilibrium;
   iteratively updating, by the informed driver model builder, the second traffic flow model using the first traffic flow model until a convergence criterion is met; and
   sending, by the second traffic flow model, to at least one informed driver and via at least one smart phone navigation application (app), vehicle navigation system, or autonomous driving system associated with the at least one informed driver, a first dynamic route from a first origin to a first destination.

2. The method of claim 1, wherein building the first traffic flow model comprises building a dynamic network loading (DNL) model using a day-to-day boundedly rational dynamic user equilibrium (BRDUE) algorithm.

3. The method of claim 2, wherein building the DNL model using the BRDUE algorithm comprises selecting one or more routes based on at least one simulated effective path delay.

4. The method of claim 1, wherein building the second traffic flow model comprises building a dynamic network loading (DNL) model using a WD DSO algorithm.

5. The method of claim 4, wherein building the DNL model using the WD DSO algorithm comprises selecting one or more routes based on: at least one path marginal cost (PMC), a utility function based on a travel cost and an information benefit, or both.

6. The method of claim 4, wherein iteratively updating the second traffic flow model comprises iteratively updating, for each route of a plurality of routes, a demand for the route.

7. The method of claim 4, wherein iteratively updating the second traffic flow model comprises determining a route decision for at least one informed driver using a multinomial logit model.

8. The method of claim 1, wherein iteratively updating the second traffic flow model using the first traffic flow model until the convergence criterion is met comprises iteratively updating the second traffic flow model for a fixed number of iterations.

9. The method of claim 1, wherein sending the first dynamic route via the at least one smart phone navigation app, vehicle navigation system, or autonomous driving system comprises sending the first dynamic route to the at least one vehicle navigation system, causing the at least one vehicle navigation system to present the first dynamic route to the at least one informed driver.

10. The method of claim 1, wherein sending the first dynamic route via the at least one smart phone navigation app, vehicle navigation system, or autonomous driving system comprises sending the first dynamic route to the at least one autonomous driving system associated with the at least one informed driver.

11. A traffic routing system for dynamically providing routes to users of vehicles, the traffic routing system comprising:
one or more processors and memory storing executable instructions for the one or more processors;
an uninformed driver model builder implemented using the one or more processors for building a first traffic flow model implemented using the one or more processors for modeling vehicle route and departure time choices of a plurality of uninformed drivers of vehicles who make the vehicle route and departure time choices based on memory of the uninformed drivers and to minimize travel times of the uninformed drivers; and
an informed driver model builder implemented using the one or more processors for building a second traffic flow model implemented using the one or more processors for modeling vehicle route and departure time choices of a plurality of informed drivers of vehicles who make the vehicle route and departure time choices using dynamic routes received from the traffic routing system and the dynamic routes are configured to achieve a within day (WD) dynamic system optimal (DSO) equilibrium;
the informed driver model builder for iteratively updating the second traffic flow model using the first traffic flow model until a convergence criterion is met; and
the second traffic flow model for sending, to at least one informed driver and via at least one smart phone navigation application (app), vehicle navigation system, or autonomous driving system associated with the at least one informed driver, a first dynamic route from a first origin to a first destination.

12. The traffic routing system of claim 11, wherein building the first traffic flow model comprises building a dynamic network loading (DNL) model using a day-to-day boundedly rational dynamic user equilibrium (BRDUE) algorithm.

13. The traffic routing system of claim 12, wherein building the DNL model using the day-to-day BRDUE algorithm comprises selecting one or more routes based on at least one simulated effective path delay.

14. The traffic routing system of claim 11, wherein building the second traffic flow model comprises building a dynamic network loading (DNL) model using a WD DSO algorithm.

15. The traffic routing system of claim 14, wherein building the DNL model using the WD DSO algorithm comprises selecting one or more routes based on: at least one path marginal cost (PMC), a utility function based on a travel cost and an information benefit, or both.

16. The traffic routing system of claim 14, wherein iteratively updating the second traffic flow model comprises iteratively updating, for each route of a plurality of routes, a demand for the route.

17. The traffic routing system of claim 14, wherein iteratively updating the second traffic flow model comprises determining a route decision for at least one informed driver using a multinomial logit model.

18. The traffic routing system of claim 11, wherein iteratively updating the second traffic flow model using the first traffic flow model until the convergence criterion is met comprises iteratively updating the second traffic flow model for a fixed number of iterations.

19. A non-transitory computer readable medium comprising computer executable instructions embodied in the non-transitory computer readable medium that when executed by at least one processor of at least one computer cause the at least one computer to perform steps comprising:
providing an uninformed driver model builder for building a first traffic flow model implemented using the one or more processors for modeling vehicle route and departure time choices of a plurality of uninformed drivers of vehicles who make the vehicle route and departure time choices based on memory of the uninformed drivers and to minimize travel times of the uninformed drivers;
providing an informed driver model builder for building a second traffic flow model implemented using the one or more processors for modeling vehicle route and departure time choices of a plurality of informed drivers of vehicles who make the vehicle route and departure time choices using dynamic routes received from the traffic routing system and the dynamic routes are configured to achieve a within day (WD) dynamic system optimal (DSO) equilibrium;
iteratively updating, by the informed driver model builder, the second traffic flow model using the first traffic flow model until a convergence criterion is met; and
sending, by the second traffic flow model, to at least one informed driver and via at least one smart phone navigation application (app), a vehicle navigation system, or autonomous driving system associated with the at least one informed driver, a first dynamic route from a first origin to a first destination.

* * * * *